(12) United States Patent
Pretschuh et al.

(10) Patent No.: US 10,410,815 B2
(45) Date of Patent: Sep. 10, 2019

(54) DRIVER CIRCUIT FOR THE OPERATION OF A RELAY

(71) Applicant: Samsung SDI Co., Ltd., Yongin-si, Gyeonggi-do (KR)

(72) Inventors: Markus Pretschuh, Graz (AT); Maximilian Hofer, Hartberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 169 days.

(21) Appl. No.: 15/629,315

(22) Filed: Jun. 21, 2017

(65) Prior Publication Data
US 2018/0122603 A1 May 3, 2018

(30) Foreign Application Priority Data
Oct. 28, 2016 (EP) .................................. 16196288

(51) Int. Cl.
| H01H 47/02 | (2006.01) |
| H01H 47/32 | (2006.01) |
| H02M 3/158 | (2006.01) |
| H02M 1/44 | (2007.01) |

(52) U.S. Cl.
CPC .......... *H01H 47/02* (2013.01); *H01H 47/325* (2013.01); *H02M 3/1582* (2013.01); *H02M 1/44* (2013.01)

(58) Field of Classification Search
CPC ... H01H 47/02; H01H 47/325; H02M 3/1582; H02M 1/44
USPC .......................................................... 307/115
See application file for complete search history.

(56) References Cited

U.S. PATENT DOCUMENTS

| 5,957,374 A | 9/1999 | Bias et al. |
| 2013/0271077 A1 | 10/2013 | Kim et al. |

FOREIGN PATENT DOCUMENTS

| EP | 2 840 584 A2 | 2/2015 |
| KR | 10-1387717 | 4/2014 |
| KR | 10-2014-0122776 | 10/2014 |

OTHER PUBLICATIONS

Extended European Search Report in corresponding European Application No. 16196288.1-1808, dated May 2, 2017, 5 pages.

*Primary Examiner* — Hal Kaplan
(74) *Attorney, Agent, or Firm* — Lewis Roca Rothgerber Christie LLP

(57) ABSTRACT

A driver circuit configured to control an operation of a relay includes: a voltage output electrically connected with the relay; a first voltage input selectively electrically connected to the voltage output; a buck boost converter including an input and a first output; and a system basis chip including an output terminal connected to the input of the buck boost converter and configured to provide a voltage. The first output of the buck boost converter is electrically connected to the first voltage input.

15 Claims, 4 Drawing Sheets

DRIVER CIRCUIT FOR THE OPERATION OF A RELAY

CROSS-REFERENCE TO RELATED APPLICATION

This patent application claims priority to and the benefit of European Patent Application No. 16196288.1, filed on Oct. 28, 2016 in the European Patent Office, the disclosure of which is incorporated herein by reference herein in its entirely.

BACKGROUND

1. Field

Aspects of embodiments of the present invention relate to a driver circuit for the operation of a relay.

2. Related Art

In battery systems, for example in battery systems of automotive vehicles, pulse width modulated (PWM) signals are often used to drive relays in a so-called low power mode, which is often also referred to as an economic mode. PWM signal drives for relays generally include relatively large filters at an input of the power supply of the drives that generally include electrolytic capacitors. Such capacitors may have a negative influence on the overall system lifetime because they are prone to a multitude of effects causing aging and degradation. Furthermore, the design of such PWM signal drives is complex, and the PWM signal drives include a plurality of components, to provide at least the aforementioned filtering, which results in high costs of production and procurement. Moreover, a PWM signal of, for example, 20 kHz may also negatively influence the EMC performance of, for example, a battery system.

SUMMARY

One or more of the drawbacks of the prior art may be avoided or at least mitigated according to aspects and features of the present invention. For example, according to embodiments of the present invention, a driver circuit for the operation of a relay includes: a voltage output for electrical connection with a relay and a first voltage input that is selectively electrically connected to the voltage output. The driver circuit further includes a buck boost converter including an input and a first output. The driver circuit further includes a system basis chip including an output terminal adapted to provide a voltage. The input of the buck boost converter is connected to the output terminal of the system basis chip, and the first output of the buck boost converter is electrically connected to the first voltage input.

In embodiments of the present invention, various components may be omitted within, for example, a battery system, because a relay may be operated by using a system basis chip that is already implemented within (e.g., included in) the system. Thus, no additional PWM signal drive needs to be provided to operate the relay, thereby increasing the overall system lifetime, and thereby substantially reducing the cost of production and procurement of the driver circuit.

In some embodiments, the system basis chip and the buck boost converter are realized within a single integrated circuit. In such an embodiment, the driver circuit may be implemented as a single coherent component which allows for a compact design of the driver circuit.

In some embodiments, the buck boost converter is adapted to provide a PRE-voltage at the first output of the buck boost converter. Furthermore, the integrated circuit is adapted to provide the PRE-voltage of the integrated circuit at the first output of the buck boost converter. Generally, a system basis chip supports different functionalities of a system, for example, of a battery system. Some of these functionalities are directed to the voltage supply of a microcontroller, which is generally included in such a system. Usually, different supply voltage levels are provided to the microcontroller of a system by the system basis chip. For example, such supplied voltage levels may include a 5V AUX voltage or, more specifically, an AUX-input of 5V, a 3.3V IO voltage, and/or a 1.25V core voltage. To generate these voltage levels, the system basis chip uses the PRE-voltage, which represents a basis voltage of the integrated circuit from which the other voltages are derived. The PRE-voltage is a pre-stage of the other voltage stages in a buck boost configuration. Such a PRE-voltage may be used to operate a relay because it has a value which is near or about the value needed to operate the relay in an economic mode.

In some embodiments, the PRE-voltage of the system basis chip is a voltage that is used as a basis for all output voltages of the system basis chip.

In some embodiments, in operation, the PRE-voltage has a value of $V_{PRE} \in [6V; 7V]$ (e.g., a value of about 6V to about 7V). In one embodiment, in operation, the PRE-voltage has a value of $V_{PRE} \approx 6.5V$. In one embodiment, the PRE-voltage has a value of $V_{PRE} = 6.5V$. In such an embodiment, the PRE-voltage may be directly used to operate the relay in an economic mode. Furthermore, such a voltage is able to drive a relay in 48V or 12V applications.

In some embodiments, the PRE-voltage is also used for the provision of a supply voltage for a microcontroller. In such an embodiment, the PRE-voltage is used for multiple purposes, which increases the overall efficiency of the system and reduces the cost of manufacturing/production of the same.

In some embodiments, the driver circuit further includes a second voltage input that is selectively electrically connected to the voltage output of the driver circuit, and the buck boost converter includes a second output that is electrically connected to the second voltage input of the driver circuit. In such an embodiment, the driver circuit allows for the provision of two different voltage levels, for example, for the provision of a high start-up voltage which assures a safe transition of the relay from an open to a closed state and for the provision of a lower non-release voltage adapted to hold the relay in the closed state.

In some embodiments, the buck boost converter is adapted to provide a second voltage at the second output of the buck boost converter, and the second voltage may be greater than a voltage provided to the first output of the buck boost converter. In such an embodiment, the second voltage may be used as the aforementioned start-up voltage, and the PRE-voltage may be used as the aforementioned non-release voltage.

In some embodiments, the second voltage is greater than the PRE-voltage. In such an embodiment, the closure of a relay may be assured.

In some embodiments, the second voltage has a value of $\in [11V; 13V]$ (e.g., a value of about 11V to about 13V). In one embodiment, the second voltage has a value of $\approx 12V$. In one embodiment, the second voltage has a value of $=12V$. Such a voltage provides for (or is ideal for) the closure of a relay in 48V or 12V applications.

In some embodiments, a first diode is arranged along an electrically conductive path between the second voltage input and the voltage output. In some embodiments, a first diode is arranged along the electrically conductive path between the second voltage input and the voltage output of the driver circuit. In such an embodiment, reverse currents occurring within the electrically conductive path between the second voltage input and the voltage output of the driver circuit are stopped from propagating.

In some embodiments, a first switch is arranged along the electrically conductive path between the second voltage input and the voltage output. The first switch may be a field effect transistor (FET), such as a MOSFET. With such a switch, the electrically conductive path may be effectively and easily interrupted. Furthermore, FETs, such as MOSFETs, may be easily realized as an integrated component and are cost-efficient.

In some embodiments, a second diode is arranged along an electrically conductive path between the first voltage input and the voltage output of the driver circuit. In such an embodiment, reverse currents occurring within the electrically conductive path between the first voltage input and the voltage output of the driver circuit are stopped from propagating.

In some embodiments, the driver circuit further includes a freewheeling diode. In such an embodiment, fast freewheeling is realized, and the components of the driver circuit are protected against excess voltage.

In some embodiments, a second switch is arranged along the electrically conductive path between the first voltage input and the voltage output of the driver circuit. In one embodiment, the second switch is a field effect transistor (FET), such as a MOSFET. With such a switch, the electrically conductive path between the first voltage input and the voltage output of the driver circuit may be effectively and easily interrupted. Furthermore, FETs may be easily realized as an integrated component and are cost-efficient.

Moreover, a method for the operation of a relay including a driver circuit is provided according to embodiments of the present invention. The method includes closing the first switch for a period of time T to close the relay, closing the second switch after the period of time T, and opening the first switch after the second switch is closed while maintaining the second switch in the closed state. Such a method allows for the efficient operation of the relay by using the PRE-voltage of the system basis chip.

Further aspects of embodiments of the present invention may be learned from the dependent claims and/or the following description.

BRIEF DESCRIPTION OF THE DRAWINGS

Aspects of the present invention will become apparent to those of ordinary skill in the art by describing, in detail, embodiments thereof with reference to the attached drawings, in which.

DETAILED DESCRIPTION

Figure 1:
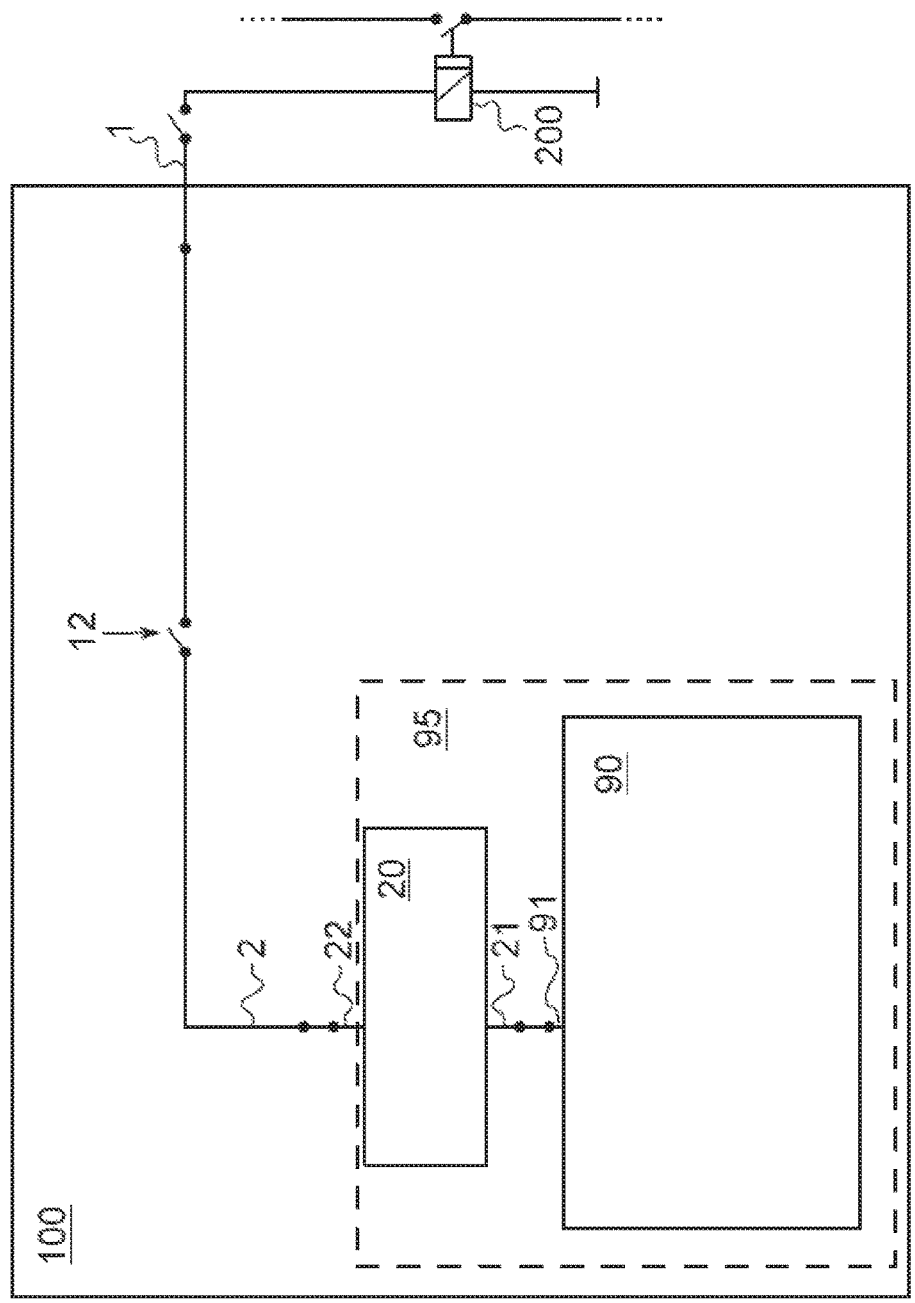
FIG. 1 illustrates a driver circuit according to a first embodiment of the invention.

As shown in FIG. 1, a first embodiment of a driver circuit 100 is adapted for the operation of a relay 200 which, in FIG. 1, is indicated in a state in which it is disconnected from the driver circuit 100. The driver circuit 100 includes a voltage output 1 for the electrical connection with the relay 200. The voltage output 1 of the driver circuit 100 may be electrically connected (e.g., selectively electrically connected) to a terminal of the relay 200. Furthermore, the driver circuit 100 includes a first voltage input 2 which is selectively electrically connected to the voltage output 1. In the first embodiment, a switch 12 is arranged along an electrically conductive path between the first voltage input 2 and the voltage output 1. The switch 12 allows for the separation (e.g., electrical separation or isolation) of the first voltage input 2 from the voltage output 1.

The driver circuit 100 includes a buck boost converter 20 including at least one input 21 and a first output 22. The first output 22 of the buck boost converter 20 is electrically connected to the first voltage input 2. The buck boost converter 20 is only schematically indicated in FIG. 1. In some embodiments, the buck boost converter 20 is a DC-to-DC converter that has an output voltage magnitude that is greater than the input voltage magnitude. For example, the buck boost converter 20 may be considered equivalent to a flyback converter using a single inductor instead of a transformer.

The driver circuit 100 further includes a system basis chip 90 including an output terminal 91 adapted to provide a voltage. In the first embodiment, as one example, the system basis chip 90 is an integrated circuit that provides various functions of automotive electronic control units (ECU) on a single die. In the first embodiment, the system basis chip 90, from among other components, is adapted to provide a voltage for a microcontroller. The input 21 of the buck boost converter 20 is connected to the output terminal 91 of the system basis chip 90.

In the first embodiment, the system basis chip 90 and the buck boost converter 20 are provided within a single integrated circuit 95. For example, the system basis chip 90 and the buck boost converter 20 are provided on the same, single die and form a single integrated component. At the output terminal 91, the system basis chip 90 outputs an output voltage to the input 21 of the buck boost converter 20. Therefore, the system basis chip 90 provides an input voltage for the buck boost converter 20, the buck boost converter 20 being adapted to convert the input voltage at the input 21 into a driving voltage for the relay 200 and to provide this driving voltage at the first output 22 thereof.

Figure 2:
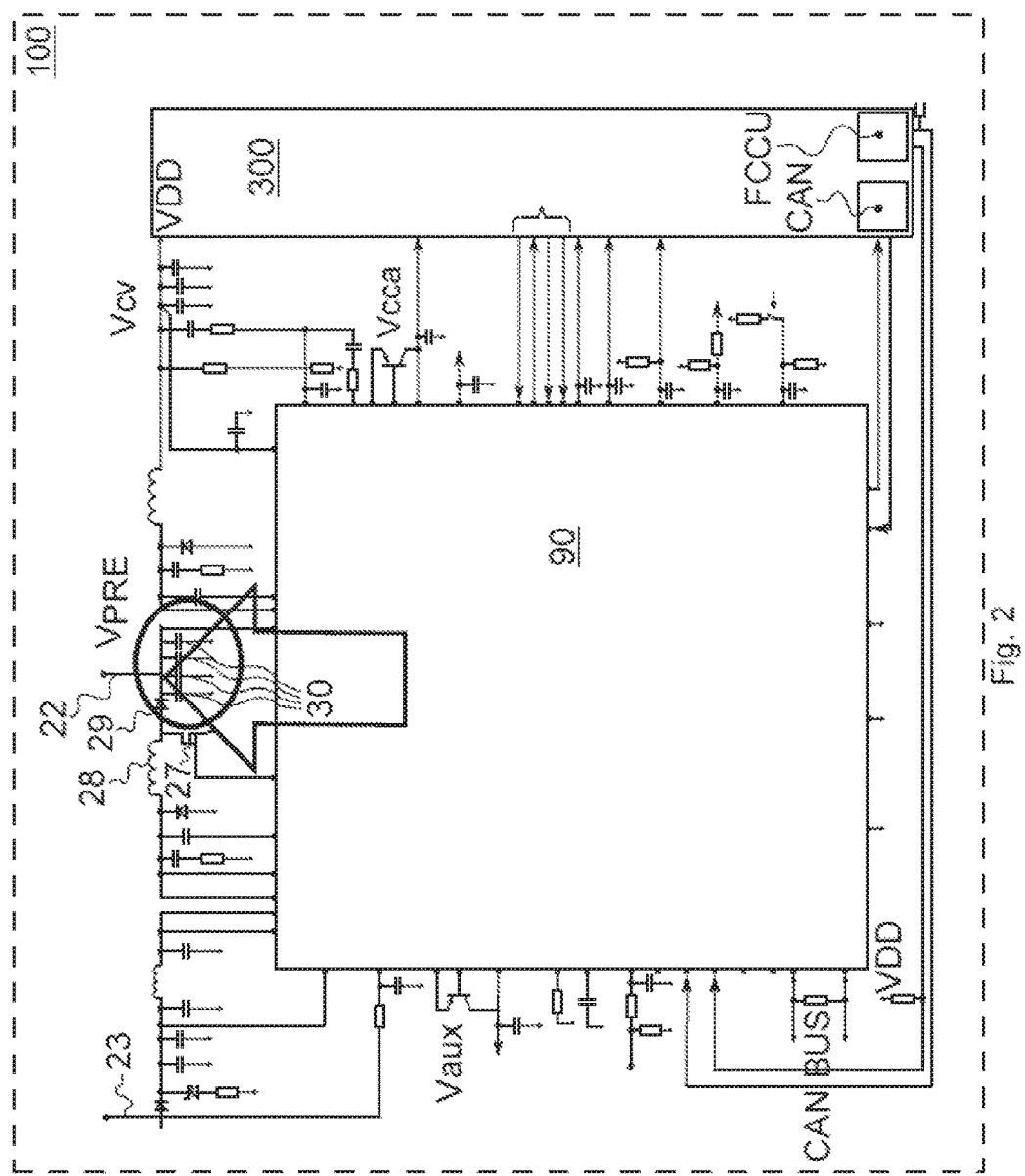
FIG. 2 illustrates a system basis chip of a driver circuit according to a second embodiment of the invention.
Figure 3:
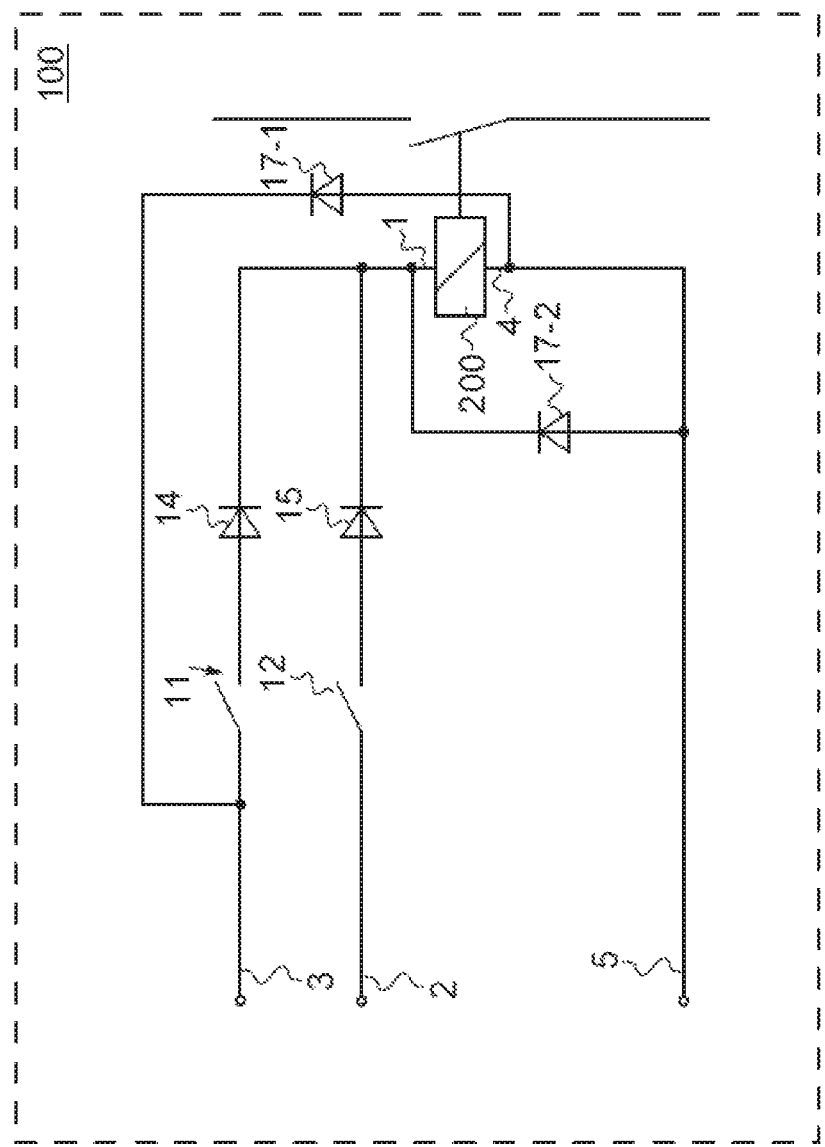
FIG. 3 illustrates electrically conductive paths of the driver circuit according to the second embodiment of the invention.

In FIGS. 2 and 3, different parts of a second embodiment of a driver circuit 100 are shown. In FIG. 2, a system basis chip 90 with a buck boost converter 20 forming a first part of the driver circuit 100 according to the second embodiment of the invention is shown. The first part of the driver circuit 100 shown in FIG. 2 is substantially identical to the corresponding part of the driver circuit 100 shown in FIG. 1. Thus, in the figures, the same reference characters indicate the same components in each of the figures.

In FIG. 2, the system basis chip 90 of the second embodiment of a driver circuit 100 is shown with a plurality of components that, from among other components, allow for the provision of different supply voltage levels for a microcontroller 300. The components of the buck boost converter 20 that are, in part, shown in FIG. 2, are connected to different terminals of the system basis chip 90, respectively. In the second embodiment, the buck boost converter 20 includes a field effect transistor 27 with a gate-terminal that is electrically connected to a corresponding terminal of the system basis chip 90. A drain terminal of the field effect transistor 27 is electrically connected to a terminal of an inductor 28 and to an anode of a diode 29. A cathode of the diode 29 is electrically connected to a plurality of capacitors 30 (e.g., four capacitors) that are connected in parallel with each other. In FIG. 2, the capacitors 30 of the buck boost converter 20 are encircled, and a first output 22 of the buck boost converter 20 is indicated with an arrow. Some components of the buck boost converter 20 are not shown in FIG. 2 and/or are not described hereinafter, as they may vary in their arrangement from chip to chip, and will be understood by one of ordinary skill in the art.

In the second embodiment, the buck boost converter 20 is adapted to provide a PRE-voltage $V_{PRE}$ at the first output 22 thereof. The PRE-voltage $V_{PRE}$ of the present embodiment has a value of $V_{PRE} \in [6V; 7V]$, in another example, $V_{PRE}=6.5V$. The PRE-voltage $V_{PRE}$ is provided via a conversion of a voltage inputted by the system basis chip 90. The PRE-voltage $V_{PRE}$ is a pre-stage $V_{PRE}$ of the other stages in the buck boost converter 20. Therefore, the accuracy of the PRE-voltage $V_{PRE}$ is not very high. In the second embodiment, the PRE-voltage $V_{PRE}$ is a voltage of about 6.5V. However, in other embodiments, other PRE-voltages $V_{PRE}$ may be realized. Other such PRE-voltages may be greater than or less than the PRE-voltage $V_{PRE}$ provided by the buck boost converter 20 shown in FIG. 2.

The PRE-voltage $V_{PRE}$ is also used as a basis supply voltage for the microcontroller 300. For example, the PRE-voltage $V_{PRE}$ is also used as a supply voltage, or as one of a plurality of different supply voltages, for the microcontroller 300. In the second embodiment, the system basis chip 90 is also adapted to provide other supply voltages for the microcontroller 300. For example, the system basis chip 90 includes a boost converter that is adapted to provide a core voltage of Vcv=1.25V. Furthermore, the system basis chip 90 also includes various (e.g., various different) low-dropout regulators (LDOs) adapted to provide a voltage $V_{aux}$=3.3V and a voltage $V_{cca}$=5V.

In the second embodiment, the buck boost converter 20 includes a second output 23 that is electrically connected to a second voltage input of the driver circuit 100, which will be described in greater detail hereinafter. The buck boost converter 20 is adapted to provide a second voltage at the second output 23 of the buck boost converter 20, and the second voltage is greater than a voltage provided at the first output 22 of the buck boost converter 20. For example, the second voltage, which is provided at the second output 23 of the buck boost converter 20, is greater than the PRE-voltage $V_{PRE}$. In the second embodiment, the second voltage may be between about 11V and 13V (e.g., the second voltage may have a value of ∈[11V; 13V]). In a further embodiment, the second voltage may be about 12V.

In the second embodiment, the system basis chip 90 is exemplarily provided as a multi-output power supply and integrated circuit device, including high speed controller area network (HSCAN) and local interconnect network (LIN) transceivers, which are generally applicable in the automotive market. However, the present invention is not limited thereto, and other system basis chips may be applicable in other embodiments.

In FIG. 3, the electrically conductive paths of the driver circuit 100 according to the second embodiment of the invention are shown. For example, while a first part of the second embodiment of the driver circuit 100 is shown in FIG. 2, a second part of the second embodiment is shown in FIG. 3. In the second embodiment, the driver circuit 100 also includes a voltage output 1 which, in FIG. 3, is shown as being connected to the first terminal of a relay 200. The relay 200 may be used in a battery system application, and allows for the switching of high currents. In the second embodiment, the battery system application includes the battery of a vehicle. Furthermore, the driver circuit 100 includes the first voltage input 2 and a second voltage input 3, which are both selectively electrically connected to the voltage output 1 of the driver circuit 100. The driver circuit 100 further includes the buck boost converter 20, which includes the first and second outputs 22, 23, and which has been described above with respect to FIG. 2. Furthermore, the driver circuit 100 includes a system basis chip 90 with the output terminal 91 that is connected to the input 21 of the buck boost converter 20, and which also has been described above with respect to FIG. 2.

In the second embodiment, a first diode 14 and a first switch 11 are arranged along an electrically conductive path between the second voltage input 3 and the voltage output 1, and a second diode 15 and a second switch 12 are arranged along the electrically conductive path between the first voltage input 2 and the voltage output 1 of the driver circuit 100. An anode of the first diode 14 is electrically connected with a first terminal of the first switch 11, and a cathode of the first diode 14 is electrically connected with the voltage output 1 of the driver circuit 100. An anode of the second diode 15 is electrically connected with a first terminal of the second switch 12, and a cathode of the second diode 15 is electrically connected with the voltage output 1 of the driver circuit 100. The second terminal of the first switch 11 is electrically connected to the second voltage input 3, and the second terminal of the second switch 12 is electrically connected to the first voltage input 2.

The second voltage input 3 is selectively electrically connected to (e.g., can be reversibly separated from) the voltage output 1 via the first switch 11. The first voltage input 2 is selectively electrically connected to (e.g., can be reversibly separated from) the voltage output 1 via the second switch 12. In the second embodiment, the driver circuit 100 includes a second voltage output 4, which is adapted for electrical connection with the relay 200. However, the present invention is not limited thereto, and other embodiments may omit the second voltage output 4. In the second embodiment, the second voltage output 4 is connected to another terminal of the relay 200. Furthermore, the driver circuit 100 includes a third voltage input 5 electrically connected to the second voltage output 4. However, the present invention is not limited thereto, and other embodiments may omit the third voltage input 5. In the second embodiment, the third voltage input 5 is electrically connected to a GND potential, thereby grounding the other terminal of the relay 200.

The driver circuit 100 further includes a plurality of freewheeling diodes 17-1, 17-2 (e.g., two freewheeling diodes), which protect the components of the driver circuit 100 from excess voltages. An anode of the first freewheeling diode 17-1 is electrically connected to the second voltage output 4, and a cathode of the first freewheeling diode 17-1 is electrically connected to the second voltage input 3. An anode of the second freewheeling diode 17-2 is electrically connected to the third voltage input 5, and a cathode of the second freewheeling diode 17-2 is electrically connected to the first voltage output 1 of the driver circuit 100.

According to some embodiments of the present invention, the first voltage input 2 of the driver circuit 100 is electrically connected to the first output 22 of the buck boost converter 20. According to some embodiments, the second voltage input 3 of the driver circuit 100 is electrically connected to the second output 23 of the buck boost converter 20. Thus, when the first switch 11 is closed for a period of time T, a voltage of about 12V is provided at the first voltage output 1, causing the relay 200 to be switched into a closed state. The period of time T is long enough to switch the relay 200 into the closed state. When the relay 200 has been switched into the closed state, the second switch 12 may be closed after the period of time T. When the second switch 12 is closed, the PRE-voltage $V_{PRE}$ is provided to the first voltage output 1, thereby holding the relay 200 in the closed state. Thus, the first switch 11 may be opened again while the second switch 12 is maintained in the closed state. In such a state, the driver circuit 100 operates in an economic mode because the power consumed during the holding of the relay 200 with the PRE-voltage $V_{PRE}$ is reduced.

Figure 4:
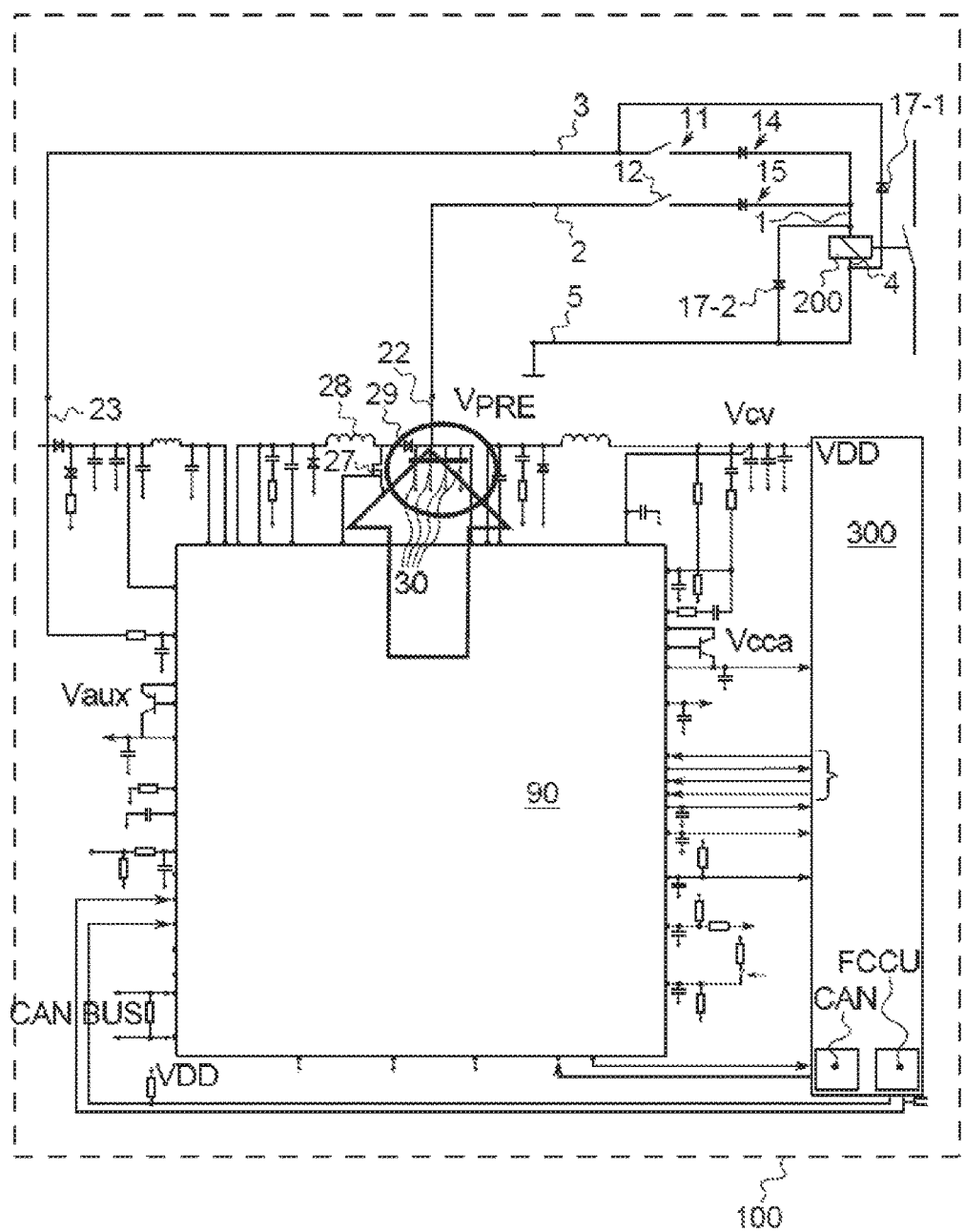
FIG. 4 illustrates a second embodiment of a driver circuit including a combination of the system basis chip shown in FIG. 2 and the conductive paths of the driver circuit shown in FIG. 3.

In FIG. 4, a schematic diagram of the system basis chip 90 shown in FIG. 2 and of the electrically conductive paths of the driver circuit 100 according to the second embodiment of the present invention is shown. For example, FIG. 4 shows the first part of the second embodiment of the driver circuit 100 as shown in FIG. 2 in combination with the second part of the second embodiment of the driver circuit 100 as shown in FIG. 3. Thus, FIG. 4 shows the complete second embodiment of the driver circuit 100 as described above. As can be seen, the first voltage input 2 of the driver circuit 100 is electrically connected to the first output 22 of the buck boost converter 20, the second voltage input 3 of the driver circuit 100 is electrically connected to the second output 23 of the buck boost converter 20, and the third voltage input 5 is electrically connected to the GND potential.

What is claimed is:

1. A driver circuit configured to control an operation of a relay, the driver circuit comprising:
   a voltage output of the driver circuit electrically connected with the relay;
   a first voltage input separably electrically connected to the voltage output;
   a buck boost converter comprising an input and a first output, the first output being electrically connected to the first voltage input; and
   a system basis chip comprising an output terminal connected to the input of the buck boost converter and configured to provide a voltage.

2. The driver circuit of claim 1, wherein the system basis chip and the buck boost converter comprise a single integrated circuit.

3. The driver circuit of claim 1, wherein the buck boost converter is adapted to provide a PRE-voltage at the first output of the buck boost converter.

4. The driver circuit of claim 3, wherein, in operation, the PRE-voltage has a value between about 6V and about 7V.

5. The driver circuit of claim 3, wherein the PRE-voltage is a supply voltage for a microcontroller.

6. The driver circuit of claim 3, further comprising a second voltage input separably electrically connected to the voltage output,
   wherein the buck boost converter comprises a second output that is electrically connected to the second voltage input of the driver circuit.

7. The driver circuit of claim 6, wherein the buck boost converter is adapted to provide a second voltage at the second output of the buck boost converter that is greater than a voltage provided to the first output of the buck boost converter.

8. The driver circuit of claim 7, wherein the second voltage is greater than the PRE-voltage.

9. The driver circuit of claim 7, wherein the second voltage has a value of about 11V to about 13V.

10. The driver circuit of claim 6, wherein a first diode is arranged along an electrically conductive path between the second voltage input and the voltage output.

11. The driver circuit of claim 10, wherein a first switch is arranged along the electrically conductive path between the second voltage input and the voltage output, the first switch being configured to separably electrically connect the second voltage input to the voltage output.

12. The driver circuit of claim 6, wherein a second diode is arranged along an electrically conductive path between the first voltage input and the voltage output.

13. The driver circuit of claim 12, wherein a second switch is arranged along the electrically conductive path between the first voltage input and the voltage output, the second switch being configured to separably electrically connect the first voltage input to the voltage output.

14. The driver circuit of claim 1, further comprising a freewheeling diode.

15. A method of operating a relay comprising a driver circuit, the method comprising:
   closing a first switch arranged along an electrically conductive path between a voltage input and a voltage output of the driver circuit for a period of time to switch the relay into a closed state, the voltage output of the driver circuit being electrically connected to the relay;
   closing a second switch arranged along an electrically conductive path between a first output of a buck boost converter and the voltage output of the driver circuit after the period of time, a system basis chip comprising an output terminal being coupled to an input of the buck boost converter; and
   opening the first switch after the second switch is closed while maintaining the second switch in the closed state.

* * * * *